United States Patent Office 3,240,745
Patented Mar. 15, 1966

3,240,745
VISCOSITY CONTROL OF ACRYLONITRILE POLYMER SOLUTIONS
Dudley W. Cheape, Jr., and Robert J. Ford, Decatur, Ala., assignors to Monsanto Company, St. Louis, Mo., a corporation of Delaware
No Drawing. Filed Sept. 17, 1964, Ser. No. 397,270
13 Claims. (Cl. 260—32.6)

This application is a continuation-in-part of our application, Serial No. 146,441, filed October 20, 1961, for Stabilized Polyacrylonitrile Polymers, now abandoned.

This invention relates to the preparation of improved spinning solutions of acrylonitrile polymers. More particularly, this invention relates to the use of aqueous polyethylene glycol as a viscosity depressant during the slurrying step in the preparation of acrylonitrile polymer spinning solutions.

In forming solutions of acrylonitrile polymers for the production of filaments and fibers it is desirable that the polymer be readily dissolved at low temperatures in order to prevent discoloration of the solution. Due to inability of the solvent to thoroughly wet and dissolve all the polymer at once some large globules or lumps of partially dissolved polymer often form which interfere with the spinning process by the creation of filtration problems. This lumping can be partially controlled by vigorous agitation applied to quickly wet all polymer particles with solvent. However, vigorous agitation results in considerable air or gas being entrained in the solution. This air or gas is very difficult to remove and results in spinning difficulties in the manufacture of fibers from such polymers. If initial viscosity could be controlled at a low level without undue agitation this would in turn facilitate the production of spinning solutions from highly soluble polymers which are essentially free of entrained gases.

Accordingly, it is an object of this invention to provide improved spinning solutions of acrylonitrile polymers.

Another object of the invention is to control viscosity in dope preparation.

It is another object of the invention to provide a method for the preparation of improved slurries of acrylonitrile polymers.

An additional object of the invention is to provide a method for controlling the viscosity of acrylonitrile polymer spinning solutions which consists of adding aqueous polyethylene glycol to the polymer, mixing the two together thoroughly, drying and grinding the mixture preparatory to the preparation of the spinning solution.

Other objects and advantages will become apparent from the description of the invention which follows hereinafter.

In general, these and other objects of the invention are accomplished by adding a suitable amount of aqueous polyethylene glycol to acrylonitrile polymers prior to solution preparation for spinning. The polyethylene glycol is preferably added to the moist acrylonitrile polymer filter cake as a concentrated water solution and is thoroughly mixed with the cake prior to its being dried and ground. After the mixing is completed the acrylonitrile polymer is then ready for solution preparation with each polymer particle coated with a thin layer of polyethylene glycol. The effect of this coating when a solvent is applied to the acrylonitrile polymer-polyethylene glycol mixture is to create a reduced rate of dissolution of the acrylonitrile polymer since the solvent must penetrate the polyethylene glycol coating in order to dissolve the polymer underneath. The temperature during the preparation of the acrylonitrile polymer slurry may vary from about −10° C. to 20° C. or higher. Preferably, the temperature should range from about −10° C. to 10° C. since the effect of the polyethylene glycol in lowering the initial viscosity is enhanced by lowering the temperature at which the dissolving takes place.

The aqueous polyethylene glycol of this invention is employed in an amount of from about 2 to 25 percent of the polymer by weight. The molecular weight of the polyethylene glycol may vary from 400 to 4,000, preferably 600 to 2,000.

Any polyacrylonitrile solvent which does not undergo side reactions with polyethylene glycol and which may be used at the temperatures involved in solution preparation may be used in practicing the instant invention. Among the solvents preferably suitable are N,N-dimethylformamide, N,N-dimethylacetamide, dimethyl sulfoxide, nitromethane, gammabutyrolactone, aqueous zinc chloride, aqueous solutions of sodium thiocyanate and the like. These solvents generally function as solvents for acrylonitrile polymers at temperatures of from about 0° C. to the boiling point of the polymer solvent mixtures.

The use of aqueous polyethylene glycol in accordance with the present invention effects improvement in solutions of all types of acrylonitrile polymers. The invention is applicable not only to polyacrylonitrile but also to copolymers, interpolymers and blends thereof, particularly those containing at least 80 percent by weight of polymerized or copolymerized acrylonitrile. Such polymeric materials include acrylonitrile fiber forming polymers with readily dyeable basic copolymers, the blend having an overall polymerized acrylonitrile content of at least 80 percent by weight.

For example, the polymer may be a copolymer of 80 to 98 percent of acrylonitrile and from 2 to 20 percent of another copolymerizable mono-olefinic monomer. Suitable copolymerizable mono-olefinic monomers include acrylic, alphachloroacrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1-bromoethylene, methacrylonitrile, acrylamide and methacrylamide, alpha-chloroacrylamide, or monoalkyl substitution products thereof; methyl vinyl ketone; vinyl carboxylates, such as vinyl acetate, vinyl chloroacetate, vinyl propionate and vinyl stearate; N-vinylimides, such as N-vinylphthalimide and N-vinylsuccinimide; methylene malonic esters, itaconic acid and itaconic ester; N-vinylcarbazole; vinylfuran; alkyl vinyl esters; vinyl sulfonic acid, ethylene alpha, beta-dicarboxylic acids or their anhydrides or derivatives, such as diethylcitraconate, diethylmesaconate; styrene, vinyl naphthalene; vinyl-substituted tertiary heterocyclic amines such as the vinyl pyridines and alkyl-substituted vinyl pyridines for example, 2-vinylpyridine, 4-vinylpyridine, 2-methyl-5-vinylpyridine and the like; 1-vinylimidazole and alkyl-substituted 1-vinylimidazoles, such as 2-, 4-, or 5-methyl-1-vinylimidazole, vinylpyrrolidone, vinylpiperidone, and other mono-olefinic copolymerizable monomeric materials.

The polymer can be a ternary interpolymer, for example, products obtained by the interpolymerization of acrylonitrile and two or more of any of the monomers, other than acrylonitrile, enumerated above. More specifically, and preferably, the ternary polymers containing from 80 to 98 percent of acrylonitrile, from 1 to 10 percent of a vinylpyridine or a 1-vinylimidazole, and from 1 to 18 percent of another copolymerizable mono-olefinic substance, such as methacrylonitrile, vinyl acetate, methyl methacrylate, vinyl chloride, vinylidene and the like, are suitable.

The polymer can also be a blend of polyacrylonitrile or a copolymer of from 80 to 99 percent acrylonitrile and from 1 to 20 percent of at least one other monoolefinic copolymerizable monomeric substance with from 2 to 50 percent of the weight of the blend of a copolymer of from 10 to 70 percent of acrylonitrile and from 30 to 90 percent of at least one other monoolefinic copolymerizable monomer. Preferably, when the polymeric material comprises a blend, it will be a blend of from 80 to 99 percent of a copolymer of 80 to 98 percent acrylonitrile and from 2 to 20 percent of another monoolefinic monomer, such as vinyl acetate, which is not receptive to dye stuff, with from 1 to 20 percent of a copolymer of from 30 to 90 percent of a vinyl-substituted tertiary heterocyclic amine such as vinylpyridine, a 1-vinylimidazole, or a vinyl lactam, and from 10 to 70 percent of acrylonitrile to give a dyeable blend having an overall vinyl-substituted tertiary heterocyclic amine content of from 2 to 10 percent based on the weight of the blend.

While the preferred polymers employed in the instant invention are those containing at least 80 percent acrylonitrile, generally recognized as the fiber-forming acrylonitrile polymers, it will be understood that the invention is likewise applicable to polymers containing less than 80 percent of acrylonitrile when such polymers are useful in forming fibers.

The polymers useful in the practice of the present invention may be prepared by any conventional polymerization procedures, such as mass polymerization methods, solution polymerization methods or aqueous emulsion procedures. If it is desired to produce shaped articles from the acrylonitrile polymer solutions of the present invention which have a modified appearance or modified properties, various agents may be added to the solutions to accomplish these effects either prior to or after the addition of polyethylene glycol thereto without any ill effects thereon. Such added agents might be pigments, dyes, anti-static agents, fire-retarding agents, and the like. Solutions containing from 8 to 30 percent by weight of acrylonitrile polymers may be employed, with the preferred concentration range being from 15 to 25 percent.

The invention is further illustrated by the following examples showing the improvements obtained by adding aqueous polyethylene glycol to moist acrylonitrile polymer cake or pellets. By adding the aqueous polyethylene glycol to the moist polymer filter cake the rate at which the polymer goes into solution is lowered thus permitting better deaeration of the slurry due to a lowered initial viscosity and reduced rate of viscosity increase. Treatment of acrylonitrile polymer cake with polyethylene glycol before drying reduces the initial slurry viscosity from 5,000 centipoises to about 500 centipoises and results in a similar reduction at equivalent times after start of slurry while maintaining the temperature below 10° C. In the examples all parts and percents are by weight unless otherwise indicated.

*Example I*

An acrylonitrile copolymer containing 92.9 percent acrylonitrile and 7.1 percent vinyl acetate was prepared in the form of wet polymer filter cake. A heavy paste made by mixing the moist polymer pellets and a 33 percent concentrated solution of polyethylene glycol in water. Following this step the samples were dried and ground. Five samples were prepared in this manner containing 0, 10, 15, 20 and 25 percent, based on dry polymer weight of polyethylene glycol of approximately 1,000 molecular weight. These samples were admixed with chilled (8° C.) dimethylacetamide in quantities to result in a polymer concentration of 26 percent. The viscosity of each sample was measured during mixing at various time intervals after combining polymer samples and solvent. During mixing the slurries increase in temperature from an 8° C. starting temperature up to 30° C. to 35° C. after 15 minutes agitation. Measurement was by means of a Brookfield Syncho Lectric Viscometer, Multispeed Model HAF having a maximum capacity of 8,000,000 centipoises. Viscosity measurements were made immediately following the addition of the polymer polyethylene glycol mixture to the solvent and again at five minute intervals for a total of four readings from each sample. The viscosity versus time curves are shown in Table I. A three-fold reduction in initial viscosity aided materially in deaeration of the slurry before the viscosity increased sufficiently to inhibit natural deaeration.

TABLE I.—VISCOSITY IN CENTIPOISES AT VARIOUS TIMES AND PERCENTAGES OF POLYETHYLENE GLYCOL

| Time | Start | 5 Min. | 10 Min. | 15 Min. |
| --- | --- | --- | --- | --- |
| Control | $1.9 \times 10^4$ | $3.3 \times 10^4$ | $4.6 \times 10^4$ | $6.4 \times 10^4$ |
| 10% PEG | $5.0 \times 10^3$ | $1.4 \times 10^4$ | $1.9 \times 10^4$ | $2.2 \times 10^4$ |
| 15% PEG | $5.6 \times 10^3$ | $1.5 \times 10^4$ | $2.0 \times 10^4$ | $2.3 \times 10^4$ |
| 20% PEG | $3.3 \times 10^3$ | $1.1 \times 10^4$ | $1.5 \times 10^4$ | $1.9 \times 10^4$ |
| 25% PEG | $1.3 \times 10^3$ | $7.0 \times 10^3$ | $9.0 \times 10^3$ | $1.1 \times 10^4$ |

*Example II*

An acrylonitrile-vinyl acetate copolymer was prepared as in Example I. Samples of this polymer containing 5 percent and 10 percent polyethylene glycol, of an average molecular weight of 1,000, were tested for viscosity. In order to further reduce the rate of viscosity increase this group of samples during slurry temperature was held to a maximum of 5° C. for the treated polymer and 8° C. for the untreated sample. The reduction in initial viscosity was almost tenfold and these slurries upon conversion to dope were notably free of entrained air bubbles. The results of this method of treatment are shown in Table II.

TABLE II

| Time | 2 Min. | 4 Min. | 6 Min. | 8 Min. | 10 Min. |
| --- | --- | --- | --- | --- | --- |
| Control | $6.0 \times 10^3$ | $1.4 \times 10^4$ | $2.0 \times 10^4$ | $2.4 \times 10^4$ | $2.7 \times 10^4$ |
| 5% PEG | $5.6 \times 10^2$ | $1.1 \times 10^3$ | $1.7 \times 10^3$ | $2.5 \times 10^3$ | $3.1 \times 10^3$ |
| 10% PEG | $2.4 \times 10^2$ | $6.4 \times 10^2$ | $1.1 \times 10^3$ | $1.7 \times 10^3$ | $1.9 \times 10^3$ |

As many variations of the present invention may be made without departing from the spirit and scope thereof the same is intended to be limited solely by the scope of the appended claims.

We claim:

1. A process for the production of low viscosity acrylonitrile polymer solutions comprising mixing an acrylonitrile polymer containing at least 85 percent acrylonitrile with from 5 to 25 percent, based on the weight of the polymer, of aqueous polyethylene glycol having a molecular weight of from about 400 to 4,000, drying the resulting mixture, reducing the polymer polyethylene glycol mixture to powder form, and dissolving the powdered mixture in a solvent at a temperature of from 0 to 20° C. to form an acrylonitrile polymer solution having an initial viscosity of less than 6,000 centipoises.

2. The process of claim 1 wherein said polymer is polyacrylonitrile.

3. The process of claim 1 wherein said polymer is a copolymer containing from 80 to 98 percent of acrylonitrile and from 2 to 20 percent of a copolymerizable monoolefinic monomer.

4. The process of claim 1 wherein said polymer is a copolymer containing from 80 to 98 percent of acrylonitrile and from 2 to 20 percent of vinyl acetate.

5. The process of claim 1 wherein said polymer is a blend of 80 to 99 percent of (A) a copolymer containing from 80 to 98 percent of acrylonitrile and from 2 to 20 percent of a copolymerizable mono-olefinic monomer and 1 to 20 percent of (B) a copolymer containing 10 to 70 percent of acrylonitrile and 30 to 90 percent of a vinyl-substituted tertiary heterocyclic amine, said blend having an overall vinyl-substituted tertiary heterocyclic amine content of from 2 to 20 percent based on the weight of the blend.

6. The process of claim 1 wherein the solvent is N,N-dimethylacetamide.

7. The process of claim 1 wherein the polyethylene glycol has an average molecular weight of from 600 to 2,000.

8. A process for the production of low viscosity solutions of a copolymer comprising 93 percent polyacrylonitrile and 7 percent vinyl acetate comprising mixing said copolymer with 10 percent, based on the weight of the polymer, of aqueous polyethylene glycol of an average molecular weight of about 1,000, drying the resulting mixture, reducing the mixture to powder form and dissolving the powdered mixture in N,N-dimethylacetamide at a temperature of from 5 to 10° C. to form a solution of said copolymer having an initial viscosity of less than 1,000 centipoises.

9. A process for the production of low viscosity solutions of a copolymer comprising 93 percent acrylonitrile and 7 percent vinyl acetate comprising mixing said copolymer with 15 percent, based on the weight of the polymer, of aqueous polyethylene glycol of a molecular weight of about 1,000, drying the resulting mixture, reducing the mixture to powder form and dissolving the powdered mixture in N,N-dimethylacetamide at a temperature of from 5 to 10° C. to form a solution of said copolymer having an initial viscosity of less than 6,000 centipoises.

10. A process for the production of low viscosity solutions of a copolymer comprising 93 percent polyacrylonitrile and 7 percent vinyl acetate comprising mixing said copolymer with 20 percent, based on the weight of the polymer, of aqueous polyethylene glycol of a molecular weight of about 1,000, drying the resulting mixture, reducing the mixture to powder form and dissolving the powdered mixture in N,N-dimethylacetamide at a temperature of from 5 to 8° C. to form a solution of said copolymer having an initial viscosity of less than 4,000 centipoises.

11. A process for the production of low viscosity solutions of a copolymer comprising 93 percent acrylonitrile and 7 percent vinyl acetate comprising mixing said copolymer with 25 percent, based on the weight of the polymer, of aqueous polyethylene glycol of a molecular weight of about 1,000, drying the resulting mixture, reducing the mixture to powder form and dissolving the powdered mixture in N,N-dimethylacetamide at a temperature of from 5 to 10° C. to form a solution of said copolymer having an initial viscosity of less than 1,500 centipoises.

12. A process for the production of low viscosity slurries of a copolymer comprising 93 percent acrylonitrile and 7 percent vinyl acetate comprising mixing said copolymer in the form of a moist filter cake with 5 percent based on the weight of the polymer of aqueous polyethylene glycol of a molecular weight of about 1,000, drying the resulting mixture, reducing the mixture to powder form and dissolving the powdered mixture in N,N-dimethylacetamide at a temperature of from 5 to 10° C. to form a solution of said copolymer having an initial viscosity of less than 1,000 centipoises.

13. A process for the production of low viscosity slurries of a copolymer containing from 80 to 98 percent of acrylonitrile and from 2 to 20 percent of a copolymerizable mono-olefinic monomer comprising mixing said copolymer in the form of a moist filter cake with 5 percent, based on the weight of the polymer, of aqueous polyethylene glycol of a molecular weight of about 1,000, drying the resulting mixture, reducing the mixture to powder form and dissolving the powdered mixture in dimethylacetamide at a temperature of from −10° C. to 10° C. to form a solution of said copolymer having an initial viscosity of about 500 centipoises.

References Cited by the Examiner
UNITED STATES PATENTS

| | | | |
|---|---|---|---|
| 2,573,949 | 11/1951 | Blizzard | 260—34.2 |
| 2,776,947 | 1/1957 | Schildknecht | 260—34.2 |

References Cited by the Applicant
UNITED STATES PATENTS

| | | |
|---|---|---|
| 2,715,112 | 8/1955 | Stanton et al. |
| 2,764,469 | 9/1956 | Kowolik et al. |
| 3,088,188 | 5/1963 | Knudsen. |
| 3,124,629 | 3/1964 | Knudsen. |

MORRIS LIEBMAN, *Primary Examiner.*